(12) United States Patent
Garrett et al.

(10) Patent No.: US 8,618,779 B2
(45) Date of Patent: Dec. 31, 2013

(54) SWITCH-MODE REGULATOR INCLUDING HYSTERETIC CONTROL

(75) Inventors: James Garrett, Nashua, NH (US); Christopher D. Bridge, Pembroke, NH (US)

(73) Assignee: Fairchild Semiconductor Corporation, San Jose, CA (US)

( * ) Notice: Subject to any disclaimer, the term of this patent is extended or adjusted under 35 U.S.C. 154(b) by 439 days.

(21) Appl. No.: 12/946,458

(22) Filed: Nov. 15, 2010

(65) Prior Publication Data

US 2011/0121806 A1 May 26, 2011

Related U.S. Application Data

(60) Provisional application No. 61/263,873, filed on Nov. 24, 2009.

(51) Int. Cl.
*G05F 1/59* (2006.01)

(52) U.S. Cl.
USPC ........... 323/271; 323/283; 323/284; 323/285; 323/299

(58) Field of Classification Search
USPC .................. 323/222, 271, 283, 284, 285, 299
See application file for complete search history.

(56) References Cited

U.S. PATENT DOCUMENTS

| | | | |
|---|---|---|---|
| 6,147,478 A | 11/2000 | Skelton et al. | |
| 6,791,306 B2 | 9/2004 | Walters et al. | |
| 6,885,175 B2 | 4/2005 | Mihalka | |
| 7,132,820 B2 | 11/2006 | Walters et al. | |
| 7,145,317 B1 | 12/2006 | Shah | |
| 7,242,168 B2* | 7/2007 | Muller et al. | 323/222 |
| 7,339,360 B2* | 3/2008 | Chen et al. | 323/284 |
| 7,457,140 B2 | 11/2008 | Klein | |
| 7,482,793 B2 | 1/2009 | Stoichita | |
| 7,598,715 B1* | 10/2009 | Hariman et al. | 323/271 |
| 7,737,668 B2* | 6/2010 | Oswald et al. | 323/259 |
| 2007/0176588 A1* | 8/2007 | Nishida | 323/284 |
| 2009/0174380 A1* | 7/2009 | Wu et al. | 323/282 |
| 2010/0026263 A1* | 2/2010 | Moussaoui et al. | 323/283 |
| 2010/0045254 A1* | 2/2010 | Grant | 323/283 |
| 2010/0188061 A1* | 7/2010 | Ma et al. | 323/247 |
| 2011/0121806 A1* | 5/2011 | Garrett et al. | 323/282 |

FOREIGN PATENT DOCUMENTS

TW 201135393 10/2011

OTHER PUBLICATIONS

Song, Chunping, "Optimizing Accuracy of Hysteretic Control", Power Electronics Technology, http://powerelectronics.com/mag/602PET20.pdf, (Feb. 2006), 14-21.

* cited by examiner

*Primary Examiner* — Jeffrey Sterrett
(74) *Attorney, Agent, or Firm* — Schwegman Lundberg & Woessner, P.A.

(57) ABSTRACT

This document discusses, among other things, a regulator circuit. The regulator circuit can controllably connect a first voltage to an inductor using a first switch and can controllably connect a second voltage to the inductor using a second switch. The first switch can be turned off and the second switch can be turned on for a duration proportional to a difference between the first voltage and a third voltage, divided by the first voltage. The first switch can be turned off and the second switch can be turned on for a duration proportional to the third voltage divided by the first voltage. One of the first or third voltages can correspond to a desired output voltage.

20 Claims, 4 Drawing Sheets

US 8,618,779 B2

SWITCH-MODE REGULATOR INCLUDING HYSTERETIC CONTROL

CLAIM OF PRIORITY

This patent application claims benefit of priority, under 35 U.S.C. Section 119(e), to Garrett et al., U.S. Provisional Patent Application Ser. No. 61/263,873, entitled "Regulator Including Hysteretic Control," filed on Nov. 24, 2009, which is hereby incorporated by reference herein in its entirety.

BACKGROUND

Electronic circuitry can be sensitive to variations in power supply voltage. Thus, a regulated power supply can be used to provide operating energy for the electronic circuitry by regulating or adjusting an input power signal to provide output power within a specified output voltage range. A regulated power supply can include a DC-DC regulator. In an example, the DC-DC regulator can receive a DC input and provide a regulated, relatively stable DC output across different load conditions, including sudden or transient changes in load current.

In certain power supplies, feedback can be used to help maintain the output voltage within the specified range. In an example, a "linear" regulator can include a shunt or series transistor operating in a partially conductive or linear region to modulate a current supplied by the regulator, such as in response to changing load conditions. In certain examples, the transistor can be controlled by feedback circuitry, such as one or more operational amplifiers, to further improve the transient response and regulation performance of the regulator. In the linear regulator, excess current not needed by the load can be diverted away from the load and dissipated elsewhere (e.g., as heat). The linear regulator can thus achieve reasonable levels of regulation performance, but at relatively high costs in terms of size, complexity, or efficiency, compared other regulators, such as a switched-mode regulator. For example, in a linear regulator, the series or shunt transistor must be able to operate continuously at the maximum rated supply current of the regulator, necessitating a relatively large shunt or series transistor as compared to correspondingly-rated switched-mode supply.

OVERVIEW

This document discusses, among other things, a regulator circuit. In certain examples, the regulator circuit can controllably connect a first voltage to an inductor using a first switch and can controllably connect a second voltage to the inductor using a second switch. In certain examples, the first switch can be turned off and the second switch can be turned on for a duration proportional to a difference between the first voltage and a third voltage, divided by the first voltage. In certain examples, the first switch can be turned off and the second switch can be turned on for a duration proportional to the third voltage divided by the first voltage. In certain examples, one of the first or third voltages can correspond to a desired output voltage.

Example 1 includes subject matter (such as an apparatus) comprising a first switch configured to controllably connect a first voltage to an inductor, a second switch configured to controllably connect a second voltage to the inductor, a switch control circuit configured to control the first and second switches using a timer circuit. In Example 1 the switch control circuit can be configured to turn off the first switch and to turn on the second switch for a duration proportional to a difference between the first voltage and a third voltage, divided by the first voltage, the switch control circuit can be configured to turn on the first switch and to turn off the second switch for a duration proportional to the third voltage divided by the first voltage. In Example 1, one of the first or third voltages can correspond to a desired output voltage, and the second voltage can be less than the first and third voltages.

In Example 2, the subject matter of Example 1 can optionally include a timer circuit comprising a digital timer circuit.

In Example 3, the subject matter of one or any combination of Examples 1-2 can optionally include a first voltage comprising an input voltage supplied to the regulator circuit, and a third voltage comprising a desired output voltage, the first voltage greater than the third voltage.

In Example 4, the subject matter of one or any combination of Examples 1-3 can optionally include a third voltage comprising an input voltage supplied to the regulator circuit, a first voltage comprising a desired output voltage, the first voltage greater than the third voltage.

In Example 5, the subject matter of one or any combination of Examples 1-4 can optionally include a total on-time of the first and second switches corresponding to a specified period when the regulator is driving a specified load, the specified period corresponding to a desired steady-state operating frequency.

In Example 6, the subject matter of one or any combination of Examples 1-5 can optionally include a timer circuit comprising a first ramp generator configured to generate a first ramp signal coupled to a first comparator, a second ramp generator configured to generate a second ramp signal coupled to a second comparator, the switch control circuit configured to control the first and second switches using the first and second comparators and the first and second ramp generators.

In Example 7, the subject matter of one or any combination of Examples 1-6 can optionally include respective first and second ramp generators including respective first and second capacitors, and wherein each of the respective first and second capacitors are charged by respective first and second current sources.

In Example 8, the subject matter of one or any combination of Examples 1-7 can optionally include first and second current sources configured to drive respective specified first and second currents proportional to the voltage at the voltage input, the first and second current sources configured to control respective first and second slew rates of the respective first and second ramp signals.

In Example 9, the subject matter of one or any combination of Examples 1-8 can optionally include a switch control circuit comprising a set-reset (SR) latch, the first comparator output coupled to a reset input of the SR latch, the second comparator output coupled to a set input of the SR latch, a non-inverted output of the SR latch coupled to the first switch, an inverted output of the SR latch coupled to the second switch, the SR latch configured to turn on or off the respective first and second switches in a mutually-exclusive manner, and the total on-time of the first and second switches corresponding to a specified period when the regulator is driving a specified load.

In Example 10, the subject matter of one or any combination of Examples 1-9 can optionally include a first ramp signal increasing with time, and a first comparator configured to compare the first ramp signal with a specified peak threshold, and in response, the switch control logic can be configured to turn on the second switch, and to reset the first ramp signal to a voltage at the inductor at a node opposite the first and second switches, when the first ramp signal reaches the specified peak threshold.

In Example 11, the subject matter of one or any combination of Examples 1-10 can optionally include a specified peak threshold proportional to and greater than the third voltage.

In Example 12, the subject matter of one or any combination of Examples 1-11 can optionally include a second ramp signal decreasing with time, and the second comparator can be configured to compare the second ramp signal with a specified valley threshold, and in response, the switch control logic can be configured to turn on the first switch, and to reset the second ramp signal to a voltage at the inductor at a node opposite the first and second switches, when the second ramp signal reaches the specified valley threshold.

In Example 13, the subject matter of one or any combination of Examples 1-12 can optionally include a specified valley threshold proportional to and less than the third voltage.

In Example 14, the subject matter of one or any combination of Examples 1-13 can optionally include a specified valley threshold controlled by a valley threshold control circuit, the valley threshold control circuit configured to provide a valley threshold less than the third voltage by a voltage proportional to the difference between the first voltage and the third voltage.

In Example 15, the subject matter of one or any combination of Examples 1-14 can optionally include a valley threshold control circuit including an adjustable gain, the specified valley threshold can be scaled by the adjustable gain.

In Example 16, the subject matter of one or any combination of Examples 1-15 can optionally include an adjustable gain controlled using information about a difference between the first voltage and the third voltage.

Example 17 can include, or can optionally be combined with the subject matter of one or any combination of Examples 1-16 to include, subject matter (such as a method, a means for performing acts, or a machine-readable medium including instructions that, when performed by the machine, cause the machine to perform acts) comprising controllably connecting a first voltage to an inductor using a first switch, controllably connecting a second voltage to the inductor using a second switch, turning off the first switch and turning on the second switch for a duration proportional to a difference between the first voltage and a third voltage, divided by the first voltage, and turning on the first switch and turning off the second switch for a duration proportional to the third voltage divided by the first voltage, wherein one of the first or third voltages corresponds to a desired output voltage, and wherein the second voltage is less than the first and third voltages.

In Example 18, the subject matter of Example 17 can optionally include providing a desired output voltage corresponding to the third voltage using the controllably connecting the first voltage and the controllably connecting the second voltage, wherein the first voltage comprises an input voltage greater than the third voltage.

In Example 19, the subject matter of one or any combination of Examples 17-18 can optionally include providing a desired output voltage corresponding to the first voltage using the controllably connecting the first voltage and the controllably connecting the second voltage, the third voltage comprising an input voltage, and the first voltage greater than the third voltage.

In Example 20, the subject matter of one or any combination of Examples 17-19 can optionally include controlling the total on-time of the first and second switches corresponding to a specified period when the inductor is driving a specified load, wherein the specified period corresponds to a desired steady-state operating frequency.

In Example 21, a system or apparatus can include, or can optionally be combined with any portion or combination of any portions of any one or more of Examples 1-20 to include, means for performing any one or more of the functions of Examples 1-20, or a machine-readable medium including instructions that, when performed by a machine, cause the machine to perform any one or more of the functions of Examples 1-20.

The examples recited herein and in the detailed description can be combined in any permutation or combination. This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In an example, a switched-mode regulator, instead of operating a shunt or series transistor in a linear region of conduction, can be connected to input power selectively by a transistor, or one or more other switches. For example, the switch can be toggled rapidly between a fully-conducting on-state and a non-conducting off-state (e.g., switching between saturation or cut-off states). In an example, the switch can be controlled using voltage or current feedback in order to provide a desired time-averaged power to a load.

In certain examples, a switched-mode regulator can use pulse-width modulation (PWM) to control the on-time of the switch connected to an unregulated DC input. In an example, the switch can selectively connect an output of the PWM regulator to the unregulated input, such as through an inductor. In certain examples, a filter can be used to reduce, suppress, or reject high frequency transient signals present at the output, including transient signals caused by cycling the switch.

In certain examples, a PWM regulator can use a hysteretic control circuit to control a first switch and a second switch. In an example, the first switch can connect a first voltage, such as input voltage, to an inductor. In this example, a second switch can connect a second voltage, such as a ground or reference voltage, to the inductor. In this example, the first and second switches can be controlled by the hysteretic control circuit, and can be turned on in a mutually-exclusive manner. In an example, the first and second switches can toggle between conducting and non-conducting states, such as to keep an instantaneous output voltage within a specified range. The specified range can be proportional to a hysteresis "window" around a desired output voltage, the window including an upper (e.g., peak) threshold and a lower (e.g., valley) threshold.

In certain examples, the output voltage can increase when the first switch is conducting, or decrease, when the second switch is conducting, such as when the inductor current is positive and flowing towards a relatively constant load resistance. The increase or decrease in output voltage can be periodic, such as when the regulator circuit has stabilized and is driving the relatively constant load. In certain examples, the variation in output voltage is caused by the regulator, and the regulator circuit is thus called a "ripple regulator" or "bang-bang" regulator.

In certain examples, the steady-state operating frequency for the regulator circuit can control a total on-time for the first and second switches, such as when the regulator circuit is connected to the relatively constant load. The steady-state operating frequency of a regulator circuit including hysteretic control can depend on the input voltage supplied to the regulator, or on the desired output voltage, or on one or more other parameters.

Figure 1:
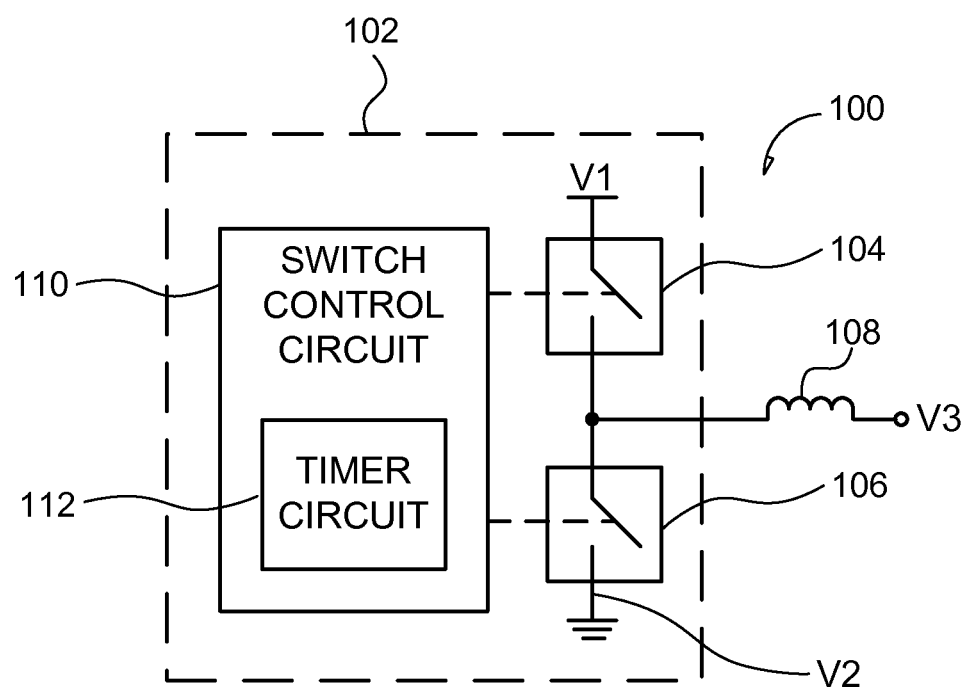
FIG. 1 illustrates generally an example of system including a regulator circuit.

FIG. 1 illustrates generally an example of system 100 including a regulator circuit 102. In certain examples, the regulator circuit 102 can include a switch control circuit 110, such as including a timer circuit 112. In certain examples, the switch control circuit 110 can be configured to control the conduction state of a first switch 104 or a second switch 106. In certain examples, the first switch 104 can be connected to a first voltage, V1, and can controllably connect an inductor 108 to V1, such as to supply current from V1 to the inductor 108. Similarly, in certain examples, the second switch 106 can connect the inductor 108 to a second voltage, V2, such as a reference voltage, a ground connection (e.g., a return or reference node connected to a load), or one or more other nodes.

In certain examples, the first and second switches 104 and 106 can include one or more other types of components or devices, such as one or more NMOS, PMOS or junction field-effect transistors (FETs), one or more insulated gate bipolar transistors (IGBTs), one or more bipolar junction transistors (BJTs), or one or more other mechanical or solid-state switches. In certain examples, the regulator circuit 102, and one or more other components or devices can be included together in a single assembly, such as co-integrated together within a single integrated circuit package, on or within a single integrated circuit die, within a multi-chip module, or in one or more other integrated packages or assemblies. For example, the regulator circuit 102 can be an integrated circuit included as a portion, part or component of an electronic device, and one or more external components, such as the inductor 108 can be electrically connected to the regulator circuit 102 to provide a DC-DC voltage converter for use in the electronic device.

Figure 4:
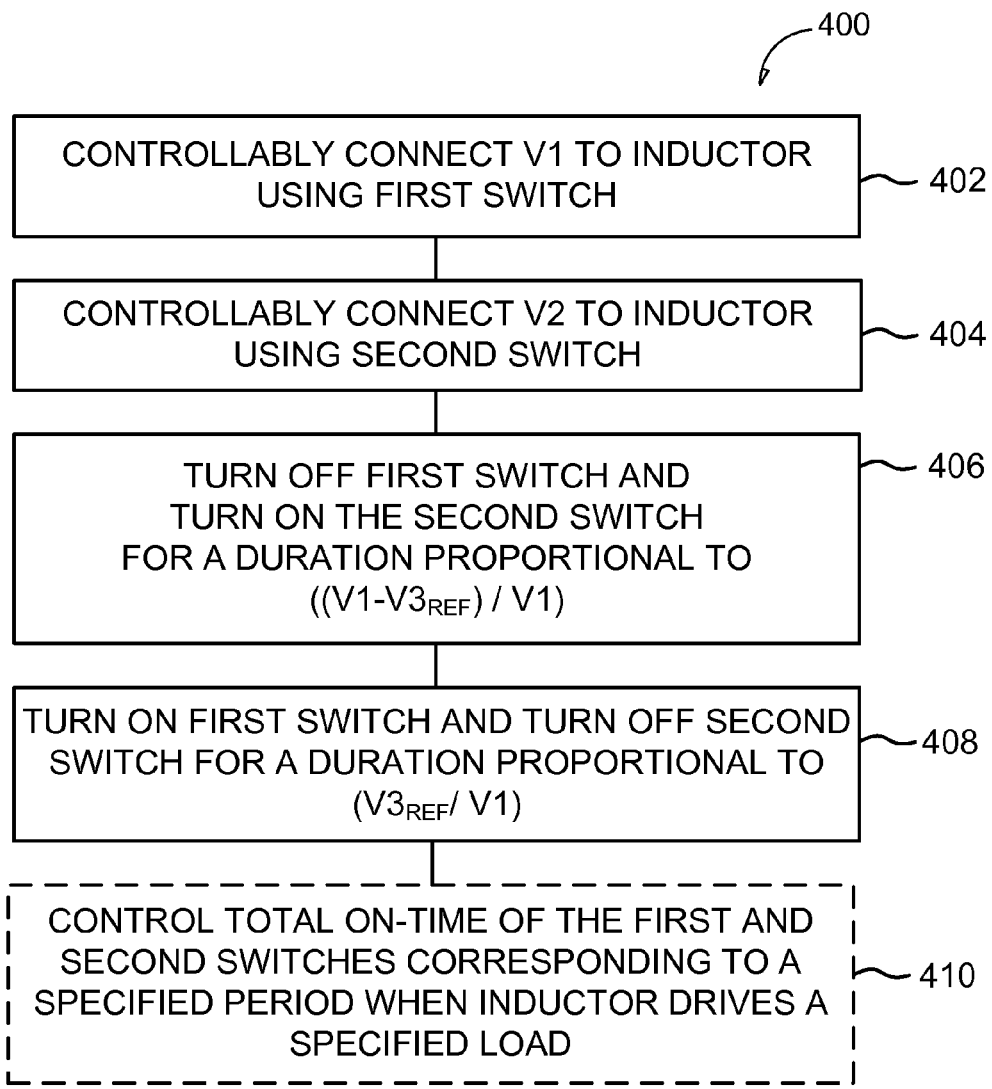
FIG. 4 illustrates generally a method of controlling a regulator circuit.

The present inventors have recognized, among other things, that the switch control circuit 110 can include a control law that responds to both an unregulated input voltage (e.g., V1), and a desired output voltage (e.g., a third voltage, $V3_{REF}$), such as using the method from the example of FIG. 4. The control circuit 110 can control the duty cycle of the first and second switches 104 and 106, such as using the timer circuit, such as according to the control law. For example, the regulator circuit can turn off the first switch and turn on the second switch for a duration proportional to a difference between the first voltage and the third voltage, divided by the first voltage (e.g. $(V1-V3_{REF})/(V1)$). In this example, the regulator can then turn off the second switch and turn on the first switch for a duration proportional to the third voltage divided by the first voltage (e.g., $(V3_{REF}/V1)$).

The present inventors have recognized, among other things, that the regulator circuit 102 can shift between the two states discussed above according to the proportions discussed above during a switching cycle period corresponding to a specified steady-state operating frequency, such as when current flowing through the inductor 108 is positive and supplying a relatively constant load.

In certain examples, the first voltage can be the unregulated input voltage, the third voltage can be the desired output voltage, and the first voltage can be greater than the third voltage (e.g., in a "buck" regulator configuration). In this manner, an instantaneous output voltage, V3, can be controlled to approximate the desired output voltage, $V3_{REF}$. Similarly, in other examples, the first voltage can be the desired output voltage, the third voltage can be the unregulated input voltage (e.g., in a "boost" regulator configuration).

Similarly, in still other examples, the first voltage can be the input voltage, the second voltage (e.g., connected to the second switch) can be the output voltage, and the third voltage can be a return node, such as a ground connection (e.g., a return or reference node connected to a load). In this example, the regulator can be in an inverting "buck-boost" configuration, such as when the first voltage is less than the third voltage (e.g., the first voltage is "less than ground"). In an example of a buck-boost configuration, the magnitude of the second voltage can be greater or less than the magnitude of the first voltage, and opposite in polarity of the first voltage.

The present inventors have also recognized that the desired fixed steady-state operating frequency can be specified for one or more purposes, such as to avoid switching at audio frequencies (e.g., to reduce or inhibit audible noise), to control or reduce electromagnetic interference, to provide a reduced component size or count for a given unregulated input voltage, to improve stability, or to improve transient response as compared to regulators lacking a fixed steady-state operating frequency. In an example, the total on-time of the first and second switches 104 and 106 can be fixed, such as using the control law discussed above, such as using the timer circuit 112. In an example, a portion of the total on-time, such as the on-time of the second switch, can be proportional to a difference between the input voltage and the desired output voltage. In certain examples, the timer circuit can be digital and can include one or more analog-to-digital converters, counters, or other circuits, such as to select a scaling factor to achieve a desired fixed steady-state operating frequency. In other examples, the timer circuit can include analog or mixed signal circuitry, such as shown in the example of FIG. 2, or including one or more other circuits or components.

In an example, the steady state operating frequency can be selected at least in part using a difference or ratio between the input voltage and the desired output voltage (e.g., ($V1-V3_{REF}$) or ($V1/V3_{REF}$), or one or more other relationships. In an example, the regulator circuit 102 can be designed to provide a specified output voltage, such as by automatically selecting an appropriate steady-state operating frequency, depending on the supplied input voltage. In other examples, a steady-state operating frequency can be selected for use across a variety of different input and output voltage combinations, such as to simplify or reduce an area of an integrated circuit including the regulator circuit 102.

Figure 2:
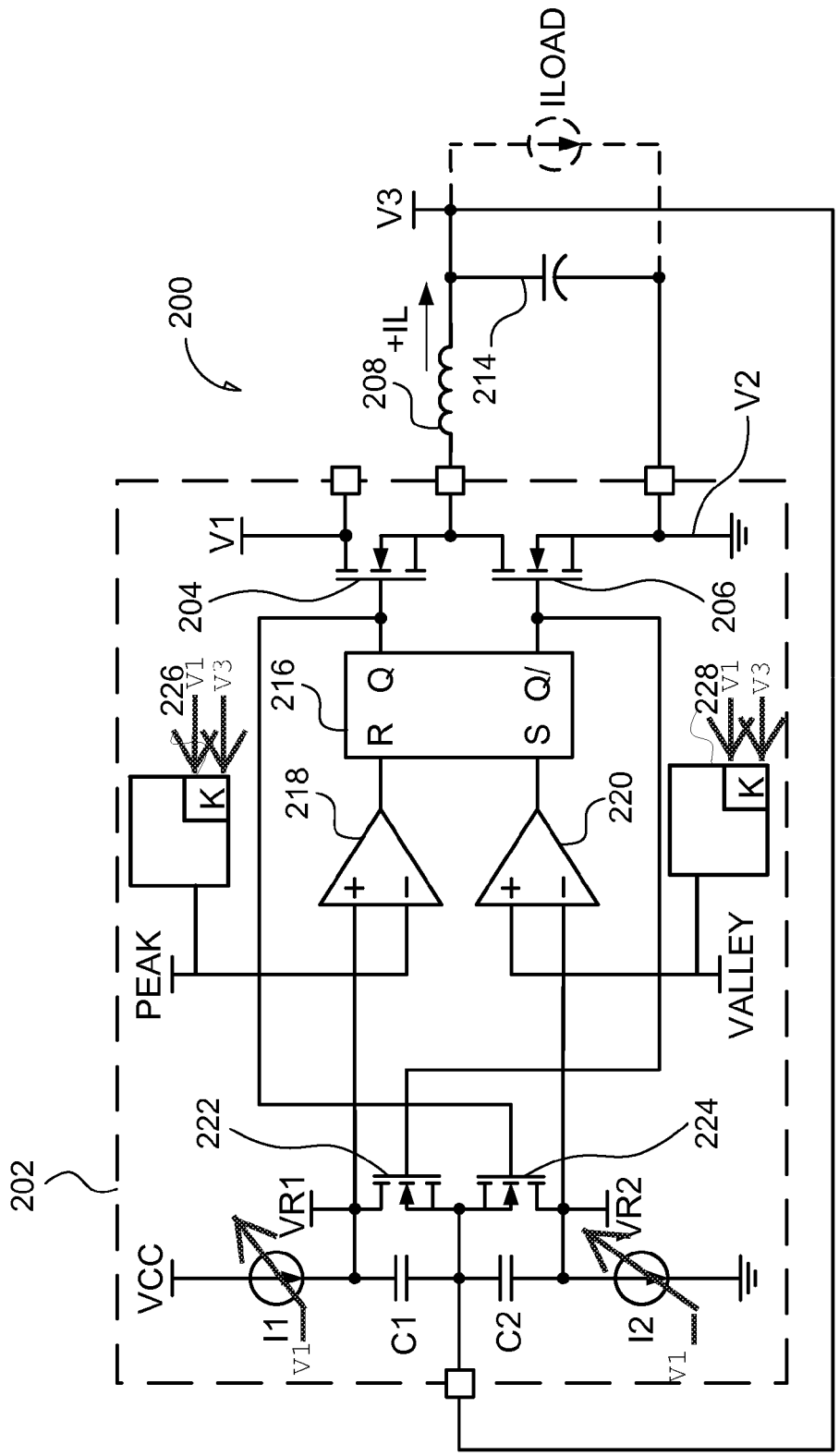
FIG. 2 illustrates generally an example of system including a regulator circuit.

FIG. 2 illustrates generally an example of system 200 including a regulator circuit 202. In this example, the regulator circuit 202 can include a first switch 204, a second switch 206, an SR latch 216, a first comparator 218, a second comparator 220, a first ramp reset switch 222, a second ramp reset switch 224, a first current source I1, a second current source I2, a first capacitor C1, and a second capacitor C2. In certain examples, the regulator circuit 202 can be connected to one or more other components, such as an inductor 208, or a capacitor 214.

In certain examples, one or more of the first switch 204, the second switch 206, the first ramp reset switch 222, or the second ramp reset switch 224 can include one or more other types of components or devices, such as one or more NMOS, PMOS or junction field-effect transistors (FETs), one or more insulated gate bipolar transistors (IGBTs), one or more bipolar junction transistors (BJTs), or one or more other mechanical or solid-state switches. In certain examples, the regulator circuit 202, and one or more other components or devices can be included together in a single assembly, such as co-integrated together within a single integrated circuit package, on or within a single integrated circuit die, within a multi-chip module, or in one or more other integrated packages or assemblies. For example, the regulator circuit 202 can be an integrated circuit included as a portion, part or component of an electronic device, and one or more external components, such as the inductor 208 can be electrically connected to the regulator circuit 202 to provide a DC-DC voltage converter for use in the electronic device.

In certain examples, the on-time of the first switch 204 can be controlled by switch control circuitry (e.g., as in FIG. 1), such as including the SR latch 216. In FIG. 2, the SR latch 216 includes a non-inverting output (e.g., "Q") coupled to the switch 204 (e.g., an NMOS transistor). In certain examples, the non-inverting output Q can be coupled to the second ramp reset switch 224, such as to reset a second ramp signal voltage stored on capacitor C2. In FIG. 2, the second switch 206 can be connected to an inverted output (e.g., "Q/") of the SR latch 216, such as to control the second switch 206 in a complementary manner to the first switch 204. For example, the second switch 206 can be turned off when the first switch 204 is turned on, and vice versa. In certain examples, the non-inverted output or the inverted output can be further processed, amplified, buffered, or the like, by one or more circuits to provide an appropriate drive signal for the first or second switches 204 or 206.

In certain examples, when the RESET input of the SR latch 216 is asserted, such as by the first comparator 218, the first switch 204 can be turned off, and the second switch 206 can be turned on. In this manner, the second switch 206 can controllably connect the inductor 208 to a second voltage, V2. In certain examples, the second voltage is less than both the first voltage, V1, and the instantaneous output voltage, V3.

In certain examples, when the SET input of the SR latch 216 is asserted, such as by the second comparator 220, the first switch 204 can be turned on, and the second switch 206 can be turned off. In this manner, the first switch 204 can controllably connect the inductor 208 to the first voltage, V1.

Figure 3:
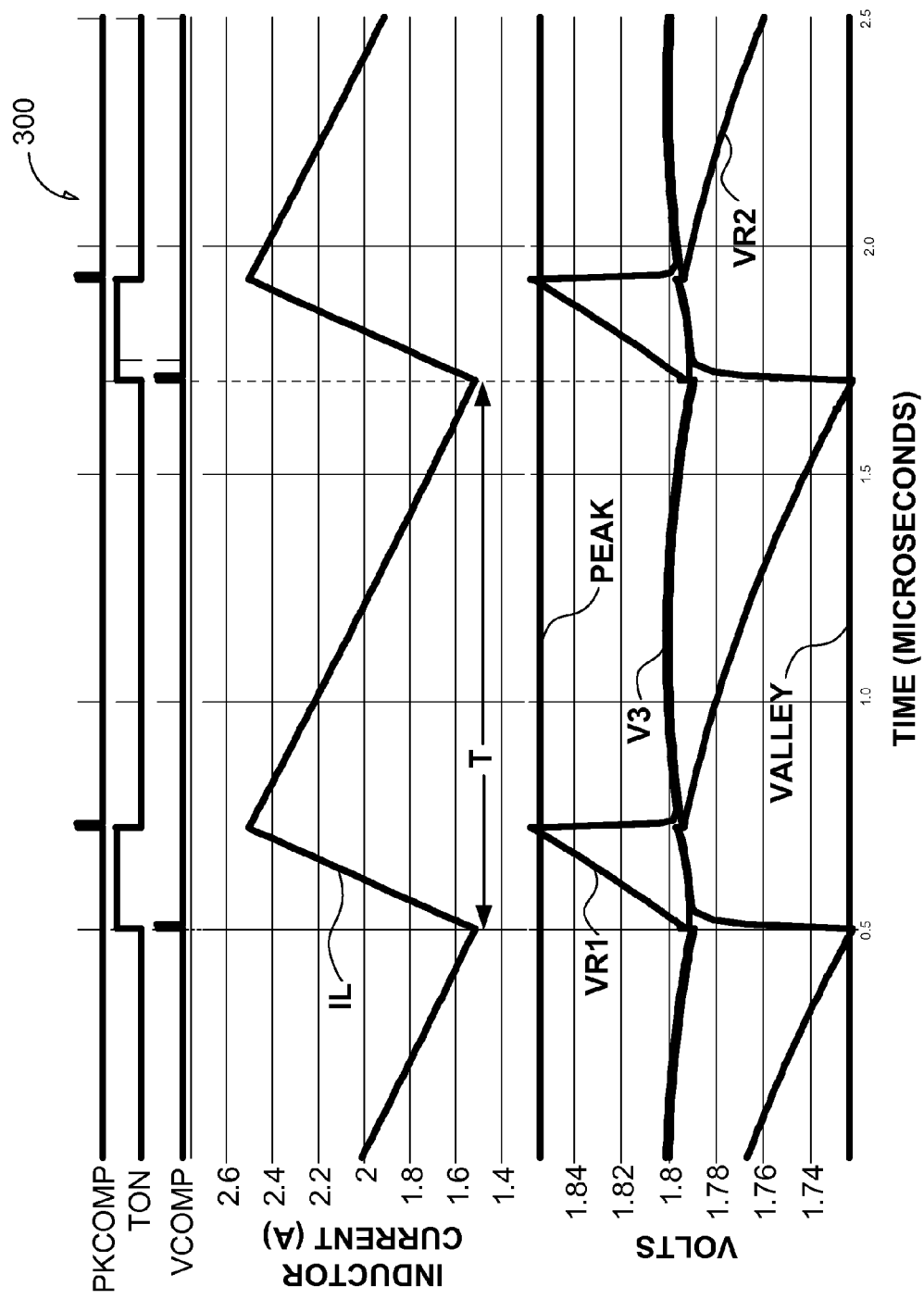
FIG. 3 illustrates generally an illustrative example of various signals, such as provided by the regulator circuit of FIG. 2.

In an illustrative example where the output voltage V3 is connected to a relatively constant load (e.g., ILOAD), the current through the inductor 208 (e.g., IL) can be positive (e.g., the regulator can be supplying current to the load), such as shown in the illustrative example of FIG. 3. In this example, the total on-time of the first switch 204 and the second switch 206 can be controlled using a control law as discussed in FIG. 1, such as to provide an output voltage V3 approximating a desired output voltage (e.g., a third voltage, $V3_{REF}$) such as when driving the relatively constant load, ILOAD.

In FIG. 2, cycling of the first and second switches 204 and 206 can be controlled using a timer circuit, such as including the first and second current sources, I1 and I2, respectively driving the first and second capacitors C1 and C2. A current source such as I1 and a capacitor such as C1 can be included as a portion of a ramp generator, since a constant current respectively injected into or removed from a capacitor can provide a voltage across the capacitor respectively increasing or decreasing at a constant rate. In certain examples, I1 and C1 can operate as a first ramp generator and I2 and C2 operate as second ramp generator, such as to provide respectively a first ramp signal, VR1, increasing with time, and a second ramp signal, VR2, decreasing with time. In certain examples, the first and second ramp signals VR1 and VR2 can be compared with respective thresholds using the first and second comparators 218 and 220, such as using a peak threshold (e.g., PEAK) connected the first comparator 218, and a valley threshold (e.g., VALLEY) connected to the second comparator 220, as shown in FIG. 2. In certain examples, one or more other circuits or components can be used as a ramp generator, such as to provide one or more of ramp signals VR1 and VR2, such as using one or more digital timers, counters, analog-to-digital converters, digital-to-analog converters, or one or more other circuits or components.

In certain examples, during steady-state operation, such as driving the relatively constant load ILOAD, the first ramp reset switch 222 can inhibit the first capacitor C1 from ramping, such as holding VR1 to about the same voltage as V3 (e.g., at the inductor 208 at a node opposite the first and second switches 204 and 206), until VR2 reaches the valley threshold. Then, in these examples, the SR latch 216 can toggle from the RESET state to the SET state, and the first ramp reset switch 222 can turn off, allowing C1 to charge, and allowing VR1 to ramp upwards. In these examples, when the SR latch 216 is SET, the second ramp reset switch 224 can prevent C2 from ramping, holding VR2 to about the same voltage as V3.

In certain examples, the first or second currents I1 or I2 can be controlled to provide a desired slew rate for one or more of the first and second ramp signals, VR1 and VR1. Similarly, in certain examples, one or more threshold voltages, such as PEAK or VALLEY can be adjusted or controlled, such as by one or more threshold control circuits, to provide a desired duty cycle or absolute on-time for the respective first and second switches 204 and 206, such as according to the control law discussed in FIGS. 1, 3, and 4.

FIG. 3 shows a plot 300 of an illustrative example of various signals, such as provided by the regulator circuits of FIG. 1 or 2, when supplying power to a relatively constant load, such as ILOAD of FIG. 2. In this illustrative example, VR1 can represent a first ramp signal, such as provided by a first ramp generator, such as including the capacitor C1 and the current source I1, as shown in FIG. 2, or one or more other components. Similarly, VR2 can represent a second ramp signal, such as provided by a second ramp generator, such as including the capacitor C2, and the current source I2, as shown in FIG. 2, or one or more other circuits or components. In this illustrative example, a current IL can represent the positive output current through an inductor, such as the inductors 108 or 208 of FIG. 1 or 2, such as supplied by the regulator circuit 102 or 202 of FIG. 1 or 2.

In FIG. 3, the first ramp signal VR1 can start from an initial value about the same as the instantaneous output voltage V3 (e.g., as shown in FIG. 1 or 2) and can ramp upwards to a voltage above V3, such as until reaching a peak threshold. In FIG. 3, the upper or peak threshold can be represented by PEAK. Similarly, in certain examples, the second ramp signal VR2 can start from an initial value about the same as V3 and can ramp downwards to a voltage below V3, such as until reaching a valley threshold. In FIG. 3, the lower or valley threshold can be represented by VALLEY.

In FIG. 3, PKCOMP can represent an output signal from a first comparator, such as the first comparator 218 of FIG. 2, and can provide a RESET signal, such as to the SR latch 216 of FIG. 2, when VR1 reaches the peak threshold, such as PEAK. Similarly, in FIG. 3, VCOMP can represent an output signal from a second comparator, such as the second comparator 220 of FIG. 2, and can provide a SET signal, such as to the SR latch 216 of FIG. 2, when VR2 decreases to the valley threshold, such as VALLEY.

In FIG. 3, TON can represent a switch control signal to a first switch, such as the first switch 104 or 204 as shown in FIG. 1 or 2, such as provided by the SR latch 216 of FIG. 2. In certain examples, when TON is high (e.g., asserted), the first switch can be turned on, and a second switch (e.g., the second switch 106 or 206) is turned off. In these examples, when the first switch is turned on, the inductor output current IL is increasing at a constant rate (and the output voltage V3 can increase). Similarly, when TON is low (e.g., de-asserted), the first switch can be turned off, and the second switch can be turned on. In these examples, when the second switch is turned on, the inductor output current IL can remain positive, but begins decreasing at a constant rate (and consequently the output voltage, V3, can also decrease). In this illustrative example, the total duration of the on-time for both the first and second switches can be represented by a switching cycle period, T.

In certain examples, T can be specified to correspond to a desired fixed steady-state operating frequency, such as by controlling one or more of the first and second current sources I1 or I2, the first or second capacitor values C1 and C2, or the peak and valley thresholds, PEAK and VALLEY, as shown in FIG. 2, such as according to the control law discussed in FIG. 1. In FIG. 3, C1 can be specified as about equal to C2 (e.g., within a specified component tolerance). In certain examples, I1 can be specified as proportional or about equal to I2 (e.g., within the accuracy of one or more current source circuits such as one or more current mirrors, transconductance amplifiers, or the like). In other examples, C1 can be specified as proportional to C2, or I1 can be specified as proportional to I2, such as to provide desired fixed steady-state operating frequency, such as when the regulator circuit is operating at or near a duty cycle extreme. A duty cycle extreme can include a regulator operating condition wherein the on-time of the first or second switch is longer than the other switch, during successive switching cycles. In an example, an integrated circuit including the regulator circuit can be made simpler or can occupy a reduced area by reducing the size of C1 or a current source configured to supply I1 with respect to C2 or a current source configured to supply I2, respectively. In an example, an integrated circuit including the regulator circuit can consume less operating power (e.g., less bias current, or one or more other currents), by reducing the size of C1 or the magnitude of I1, with respect to C2, or the magnitude of I2, respectively.

In certain examples, a third voltage, $V3_{REF}$ can represent a desired output voltage to be provided by the regulator circuit. PEAK can be specified as a voltage proportional to and greater than $V3_{REF}$, such as provided by a peak threshold generator circuit 226 (e.g., including one or more circuits or components such as one or more amplifiers, buffers, current sources, current mirrors or one or more other circuits). In an example, such as shown in FIG. 3, $$\text{PEAK}=(K_1+1)*V3_{REF}, \quad (1)$$

$$I1=K_2*V1, \quad (2)$$

and thus, $$\text{TON}=(C1*K_1*V3_{REF})/I1=(C1*K_1*V3_{REF})/(K_2*V1) \quad (3)$$

In this example, TON can be the on-time of the first switch during a switching cycle T. $K_1$ can represent a unit-less positive window or offset proportion, such as using $K_1$=0.03 in the example of FIG. 3. Thus, in this example, PEAK can be 103% of the desired output voltage, $V3_{REF}$. $K_2$ can represent a transconductance constant, and can be used to control the operating frequency of the regulator circuit, such as using $K_2$=0.45 microamperes/volt for the example of FIG. 3 (e.g., corresponding to an integrated circuit implementation of the regulator circuit). Thus, in this example, the first switch can be turned on for a duration proportional to the third voltage, $V3_{REF}$, divided by the first voltage, V1.

VALLEY can be specified as a voltage proportional to (V1-$V3_{REF}$) and less than $V3_{REF}$, such as provided by the valley threshold generator circuit 228. In an example, such as shown in FIG. 3, $$\text{VALLEY}=V3_{REF}-K_1*(V1-V3_{REF}), \quad (4)$$

$$I2=K2*V1, \quad (5)$$

and thus, a turn-on time for the second switch can be represented as $$TON2 = (C2*K_1*(V1-V3_{REF}))/I2 \quad (6)$$
$$= (C2*K_1*(V1-V3_{REF}))/(K_2*V1).$$

In this example, TON2 can also be about the same as the turn-off time for the first switch. Thus, in this example, the second switch can be turned on for a duration proportional to the difference between the first voltage and the third voltage, divided by the first voltage. The total switching cycle period can be represented as $$T=\text{TON}+\text{TON2}=C2*K_1/K_2. \quad (7)$$

In FIG. 3, C1=C2=20 picofarads, and the switching cycle period can correspond to a switching frequency of around 750 kilohertz, such as using the $K_1$, $K_2$ values discussed above.

In certain examples, one or more of PEAK, VALLEY, TON, or TON2 can be scaled depending on a difference between desired output voltage $V3_{REF}$ and the input voltage V1, such as to enhance transient response or stability, such as while still keeping the specified operating frequency fixed. In the example of FIG. 3, the valley threshold VALLEY can be modified using a gain constant K, such as using a valley threshold control circuit, and the current I2 can be set to I2/K, such that $$\text{VALLEY}=V3_{REF}-(K_1/K)*(V1-V3_{REF}) \quad (8)$$

$$\text{TON2}=(C2*K_1*((V1-V3_{REF})/K))/(I2/K). \quad (9)$$

In this example, the on-time TON2 can be represented as in EQUATION 9, but the K's can cancel each other, so that TON2 is the same as EQUATION 6. In certain examples, K can be adjustable, varying continuously or discretely, such as depending on a difference between desired output voltage $V3_{REF}$ and the input voltage V1. In an example, discrete K values can be stored, such as in a look-up table, or using a digital circuit using one or more analytical functions, such as to provide a specified K value corresponding to a specified input voltage range and a desired output voltage range.

In the illustrative example of FIG. 3, when V1=12V, and $V3_{REF}$=1.8V, K=4 can be selected, such as automatically by the regulator circuit, such as using a ratio or difference between $V3_{REF}$ and V1, or by using a look-up table, or by using one or more other discrete or continuous functions or mappings of V1 or $V3_{REF}$ to K. In certain examples, K can be selected or adjusted using one or more comparators or current mirrors, such as included in the valley threshold control circuit. In certain examples, for relatively small values of (V1-$V3_{REF}$), VALLEY can be decreased (e.g., increasing the hysteretic "window" between $V3_{REF}$ and VALLEY), such as to improve stability or to inhibit "chattering," such as by using a small K value (e.g., 0.25 or some other value less than unity).

In certain examples, for relatively large values of (V1-$V3_{REF}$), VALLEY can be increased (e.g., decreasing the hysteretic "window" between PEAK and VALLEY), such as using a larger K value (e.g., K=4 as shown in FIG. 3), such as to improve transient response. Similarly, in certain examples, one or more other parameters such as I1, I2, $K_1$, or $K_2$ can be scaled or selected such as by using a look-up table, or by using one or more other discrete or continuous functions or mappings of V1 or $V3_{REF}$ to the one or more other parameters (e.g., such as using one or more analog or digital circuits, or memories). In certain examples, one or more of I1, I2, $K_1$, $K_2$, K, or one or more other operating parameters used by the regulator circuit can be specified, adjusted, or programmed, such as electrically or physically, such as by writing to a memory circuit, blowing one or more fuses, trimming or modifying one or more metal or other circuit features, or the like. In an example, one or more of I1, I2, $K_1$, $K_2$, K, or one or more other operating parameters can be programmed digitally, such as using a serial or parallel bus interface, or one or more other interfaces, such as provided by one or more input or output pins included as a portion of an integrated circuit package including the regulator circuit.

In certain examples, a phase-locked loop (PLL) or one or more other circuits can be used to adjust one or more of I1, I2, $K_1$, $K_2$, K, or one or more other operating parameters, such as to correct for an error between a desired operating frequency and an instantaneous operating frequency of the regulator circuit. In an example, the instantaneous operating frequency of the regulator circuit can be monitored by the PLL, such as at the non-inverting output Q of the SR Latch 216 of FIG. 2, or monitored at one or more other nodes. In an example, I1 or I2 can be scaled in proportion to a frequency error as provided by an error output of the PLL, such as an output of a phase detector or discriminator included as a portion, part, or component of the PLL. In an example, I1 or I2 can be inverted, instead of, or in addition to scaling, such as in response to a frequency error as provided by an error output of the PLL.

In FIG. 3, the regulator circuit can be supplying a relatively constant load of 2 amperes (e.g., ILOAD as shown in FIG. 2), such as representing a steady-state operating condition of the regulator. In this example, VALLEY=1.723 volts, and PEAK=1.85 volts.

FIG. 4 illustrates generally a method 400 of controlling a regulator circuit, such as using the regulator circuit shown in FIG. 1 or 2, or discussed in the illustrative example of FIG. 3.

At 402, a first switch can controllably connect a first voltage, V1, to an inductor, such as using the first switch 104 or 204 or the inductor 108 or 208, as shown in FIG. 1 or 2. At 404, a second switch can controllably connect a second voltage, such as a ground or reference voltage, V2, to the inductor, such as using the second 106 or 206 as shown in FIG. 1 or 2.

At 406, a control law such as discussed in FIGS. 1-3 can be used, such as including turning off the first switch and turning on the second switch for a duration proportional to a difference between the first voltage, V1, and a third voltage, $V3_{REF}$, divided by the first voltage, V1. At 408, the control law can include turning on the first switch and turning off the second switch for a duration proportional to the third voltage, $V3_{REF}$, divided by the first voltage, V1.

In certain examples, at 410, the method 400 can include controlling a total on-time of the first and second switches corresponding to a specified period when the inductor is driving a specified load, such as the switching cycle period T of FIG. 3.

In certain examples, the regulator circuit (e.g., regulator circuits 102 or 202) can operate in one or more PWM modes, such as using hysteretic control as discussed above in FIGS. 1-4, such as when the inductor current is positive. However, in certain examples, when the inductor current is negative, such as during a specified number of switching cycles, the regulator circuit can operate in a pulse frequency modulation (PFM) mode, such as to inhibit the second switch from dissipating the energy stored in the inductor. In this manner, the efficiency of the regulator circuit can be increased as compared to a regulator circuit operating solely using a PWM mode, such as including hysteretic control. In certain examples, the PFM mode can be used instead of or in addition the PWM mode, such as when a large error exists between the desired output voltage (e.g., $V3_{REF}$), and the instantaneous output voltage (e.g., V3).

In an example, when the regulator circuit (e.g., the regulator circuits 102 or 202) is first started up or subjected to a short circuit condition, such as at the V3 node, a soft-start circuit or mode can be used to gradually increase the voltage at the V3 node. For example, if the regulator circuit lacks the soft-start circuit or mode, the first switch can remain turned on for a much longer duration than during steady-state operation. The long duration can damage the first switch 104. The soft-start circuit or mode can limit the on-time of the first or second switches 104 or 106, such as to prevent damage to the switches. In certain examples, the soft-start circuit or mode can be used instead of or in addition to the one or more PWM modes, such as using hysteretic control, as discussed above in FIGS. 1-4.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

The claimed invention is:

1. A regulator circuit, comprising:
    a first switch configured to controllably connect a first voltage to an inductor;
    a second switch configured to controllably connect a second voltage to the inductor;
    a switch control circuit configured to control the first and second switches using a timer circuit;
    wherein the switch control circuit is configured to turn off the first switch and to turn on the second switch for a duration proportional to a difference between the first voltage and a third voltage, divided by the first voltage;
    wherein the switch control circuit is configured to turn on the first switch and to turn off the second switch for a duration proportional to the third voltage divided by the first voltage;
    wherein one of the first or third voltages corresponds to a desired output voltage;
    wherein the second voltage is less than the first and third voltages; and
    wherein the switch control circuit includes at least one of a peak threshold control circuit and a valley threshold control circuit and wherein the switch cycling period is adjustable using the at least one of the peak threshold control circuit and the valley threshold control circuit.

2. The regulator circuit of claim 1, wherein the timer circuit includes a digital timer circuit.

3. The regulator circuit of claim 1, wherein the first voltage comprises an input voltage supplied to the regulator circuit;
    wherein the third voltage comprises a desired output voltage; and
    wherein the first voltage is greater than the third voltage.

4. The regulator circuit of claim 1, wherein the third voltage comprises an input voltage supplied to the regulator circuit;
    wherein the first voltage comprises a desired output voltage; and
    wherein the first voltage is greater than the third voltage.

5. The regulator circuit of claim 1, wherein the total on-time of the first and second switches corresponds to a specified period when the regulator is driving a specified load; and
    wherein the specified period corresponds to a desired steady-state operating frequency.

6. The regulator circuit of claim 1, wherein the timer circuit comprises:
    a first ramp generator configured to generate a first ramp signal coupled to a first comparator;
    a second ramp generator configured to generate a second ramp signal coupled to a second comparator; and
    wherein the switch control circuit is configured to control the first and second switches using the first and second comparators and the first and second ramp generators.

7. The regulator circuit of claim 6, wherein the respective first and second ramp generators include respective first and second capacitors, and wherein each of the respective first and second capacitors are charged by respective first and second current sources.

8. The regulator circuit of claim 7, wherein the first and second current sources are configured to drive respective specified first and second currents proportional to the voltage at the voltage input; and
    wherein the first and second current sources are configured to control respective first and second slew rates of the respective first and second ramp signals.

9. The regulator circuit of claim 6, wherein the switch control circuit comprises:
    a set-reset (SR) latch;
    wherein the first comparator output is coupled to a reset input of the SR latch;
    wherein the second comparator output is coupled to a set input of the SR latch;
    wherein a non-inverted output of the SR latch is coupled to the first switch;
    wherein an inverted output of the SR latch is coupled to the second switch;
    wherein the SR latch is configured to turn on or off the respective first and second switches in a mutually-exclusive manner; and wherein the total on-time of the first and second switches corresponds to a specified period when the regulator is driving a specified load.

10. The regulator circuit of claim 6, wherein the first ramp signal increases with time; and
   wherein the first comparator is configured to compare the first ramp signal with a specified peak threshold, and in response, wherein the switch control logic is configured to turn on the second switch, and to reset the first ramp signal to a voltage at the inductor at a node opposite the first and second switches, when the first ramp signal reaches the specified peak threshold.

11. The regulator circuit of claim 10, wherein the specified peak threshold is proportional to and greater than the third voltage.

12. The regulator circuit of claim 1, wherein the timer circuit comprises:
   a first ramp generator configured to generate a first ramp signal coupled to a first comparator;
   a second ramp generator configured to generate a second ramp signal coupled to a second comparator; and
   wherein the second ramp signal decreases with time; and
   wherein the second comparator is configured to compare the second ramp signal with a specified valley threshold, and in response, wherein the switch control logic is configured to turn on the first switch, and to reset the second ramp signal to a voltage at the inductor at a node opposite the first and second switches, when the second ramp signal reaches the specified valley threshold.

13. The regulator circuit of claim 12, wherein the specified valley threshold is proportional to and less than the third voltage.

14. The regulator circuit of claim 12, wherein the specified valley threshold is controlled by a valley threshold control circuit; and
   wherein the valley threshold control circuit is configured to provide a valley threshold less than the third voltage by a voltage proportional to the difference between the first voltage and the third voltage.

15. The regulator circuit of claim 14, wherein the valley threshold control circuit includes an adjustable gain; and wherein the specified valley threshold is scaled by the adjustable gain.

16. The regulator circuit of claim 15, wherein the adjustable gain is controlled using information about a difference between the first voltage and the third voltage.

17. A method, comprising:
   controllably connecting a first voltage to an inductor using a first switch;
   controllably connecting a second voltage to the inductor using a second switch;
   turning off the first switch and turning on the second switch for a duration proportional to a difference between the first voltage and a third voltage, divided by the first voltage; and
   turning on the first switch and turning off the second switch for a duration proportional to the third voltage divided by the first voltage, wherein one of the first or third voltages corresponds to a desired output voltage, and wherein the second voltage is less than the first and third voltages; and
   adjusting a switch cycling period using at least one of a peak threshold control circuit and a valley threshold control circuit.

18. The method of claim 17, comprising providing a desired output voltage corresponding to the third voltage using the controllably connecting the first voltage and the controllably connecting the second voltage, wherein the first voltage comprises an input voltage greater than the third voltage.

19. The method of claim 17, comprising providing a desired output voltage corresponding to the first voltage using the controllably connecting the first voltage and the controllably connecting the second voltage, wherein the third voltage comprises an input voltage, and wherein the first voltage is greater than the third voltage.

20. The method of claim 17, comprising controlling the total on-time of the first and second switches corresponding to a specified period when the inductor is driving a specified load, wherein the specified period corresponds to a desired steady-state operating frequency.

* * * * *